United States Patent [19]

Kumar et al.

[11] Patent Number: 5,717,885
[45] Date of Patent: Feb. 10, 1998

[54] TLB ORGANIZATION WITH VARIABLE PAGE SIZE MAPPING AND VICTIM-CACHING

[75] Inventors: Rajendra Kumar, Sunnyvale; Paul G. Emerson, San Jose, both of Calif.

[73] Assignee: Hewlett-Packard Company, Palo Alto, Calif.

[21] Appl. No.: 741,749

[22] Filed: Nov. 5, 1996

Related U.S. Application Data

[63] Continuation of Ser. No. 312,857, Sep. 27, 1994, abandoned.
[51] Int. Cl.$^6$ .................................................. G06F 12/10
[52] U.S. Cl. ........................... 395/417; 395/447; 395/455
[58] Field of Search .................................. 395/446, 447, 395/449, 415, 416, 417, 455

[56] References Cited

U.S. PATENT DOCUMENTS

| | | | |
|---|---|---|---|
| 5,133,058 | 7/1992 | Jensen | 395/417 |
| 5,155,832 | 10/1992 | Hunt | 395/447 |
| 5,163,140 | 11/1992 | Stiles et al. | 395/467 |
| 5,263,140 | 11/1993 | Riordan | 395/417 |
| 5,327,372 | 7/1994 | Oka et al. | 365/49 |
| 5,412,787 | 5/1995 | Forsyth et al. | 395/417 |
| 5,465,337 | 11/1995 | Kong | 395/417 |
| 5,526,504 | 6/1996 | Hsu et al. | 395/417 |

FOREIGN PATENT DOCUMENTS

| | | |
|---|---|---|
| 0496288A2 | 7/1992 | European Pat. Off. . |
| 0506236A1 | 9/1992 | European Pat. Off. . |
| 0613089A1 | 8/1994 | European Pat. Off. . |
| 0676698A1 | 10/1995 | European Pat. Off. . |

OTHER PUBLICATIONS

Jouppi, Norman P., Improving Direct–Mapped Cache Performance by the Addition of a Small Fully–Associative Cache and Prefetch Buffers, Proceedings of the 17th Annual International Symposium on Computer Architecture, at 364–73 (IEEE 1990).

*Primary Examiner*—Tariq R. Hafiz
*Assistant Examiner*—Kevin Verbrugge

[57] ABSTRACT

A translation look-aside buffer (TLB) for translating a variable page size virtual page number to a physical page number. The TLB partitions the virtual page number into an upper portion and a lower portion. The upper portion is always compared to an upper virtual page number entry in a first content addressable memory while only certain bits of lower portion are selectively compared to a corresponding number of bits in a lower virtual page number entry in a second content addressable memory. The number of bits compared in the second content addressable memory is determined by the specified size of the physical page. The TLB includes a page size memory having a plurality of page size entries wherein the certain number of bits for each of the lower virtual page entries is specified by a corresponding page size entry. Associated with each bit in the lower virtual page number entries is an enable transistor for selectively enabling the comparison of that bit in the lower virtual page number entry. The enable gate includes a control input coupled to a corresponding bit in a corresponding page size entry, the enable transistor selectively enabling the single bit comparison when the corresponding bit in the page size entry is set to an enable state and selectively disabling the comparison when the corresponding bit in the page size entry is set to a disable state.

5 Claims, 3 Drawing Sheets

TLB ORGANIZATION WITH VARIABLE PAGE SIZE MAPPING AND VICTIM-CACHING

CROSS REFERENCE TO RELATED APPLICATIONS

This is a continuation of application Ser. No. 08/312,857 filed on Sep. 27, 1994, now abandoned.

BACKGROUND OF THE INVENTION

This invention relates generally to memory systems for computers and more particularly to cache organizations for virtual to physical address translation.

Virtual memory is an addressing scheme used in computer architectures to provide a computer programmer with a significantly larger address space than is physically present in the computer. Portions of the virtual memory space are mapped to portions of the physical memory space by way of a virtual to physical address translation. This translation is typically accomplished by a page table which, for a given virtual page number, produces a corresponding physical page number. This translation scheme requires the physical memory to be broken up into discrete portions or so-called pages. Pages of virtual memory can then be brought into the physical address space as needed by the computer program.

The selection of a page size includes a tradeoff. The smaller the pages the greater number of entries are required in the page table. As a result, more memory is consumed by the page table. Typically this page table must be present in memory at all times. Making the pages larger, however, results in internal fragmentation when the program does not require all of the memory space of a given page. In addition, larger page sizes consume more I/O bandwidth and increase a process start-up time.

A technique that has been proposed for balancing these tradeoffs is providing variable page sizes. Typically this technique allows the operating system to specify a different page size for a given process. The entries in the page table for the given process are then modified accordingly to reflect the change in the page size. Variable page sizes have a significant impact on the cache that is used to store the virtual to physical address translations. A typical cache has a fixed-length tag stored in a content addressable memory (CAM). Varying the page size affects the number of bits that are required to be stored in the content addressable memory.

Accordingly, a need remains for a cache memory for storing virtual to physical address translations in a variable page size virtual memory system.

SUMMARY OF THE INVENTION

It is, therefore, an object of the invention to provide a flexible cache memory for storing virtual-to-physical address translations in a variable page size virtual memory system.

A translation look-aside buffer (TLB) for translating a variable size virtual page number to a physical page number is described. The TLB according to the invention includes a page number memory for storing a plurality of physical page number entries. The TLB also includes a first content addressable memory including a plurality of upper virtual page entries and a comparator circuit for each upper virtual page entry for comparing an upper portion of the virtual page number to the upper virtual page entries and indicating a match if the upper portion is found therein. The TLB further includes a second content addressable memory including a plurality of lower virtual page entries and a comparator circuit for each lower virtual page entry for selectively comparing a certain number of bits of a lower portion of the virtual page number to a corresponding number of certain bits in the lower virtual page entries and indicating a match if the certain number of bits of the lower portion are found therein. If a match is produced in both first and second content addressable memories, the TLB indicates a hit, and therefore produces a valid translation. The TLB further includes a page size memory including a plurality of page size entries wherein the certain number of bits for each of the lower virtual page entries is specified by the corresponding page size entry.

An advantage of the invention is that the TLB can support different page sizes for each entry in the TLB.

In another aspect of the invention, a fully-associative victim cache is coupled to the TLB in order to store the TLB entries that are removed from the TLB. In the event there is a miss in the TLB, the victim cache is searched to see if the virtual to physical address translation resides therein.

A further advantage of the invention is an improved miss rate for the combined TLB and victim cache as compared to the TLB alone.

The foregoing and other objects, features and advantages of the invention will become more readily apparent from the following detailed description of a preferred embodiment of the invention which proceeds with reference to the accompanying drawings.

DETAILED DESCRIPTION

Figure 1:
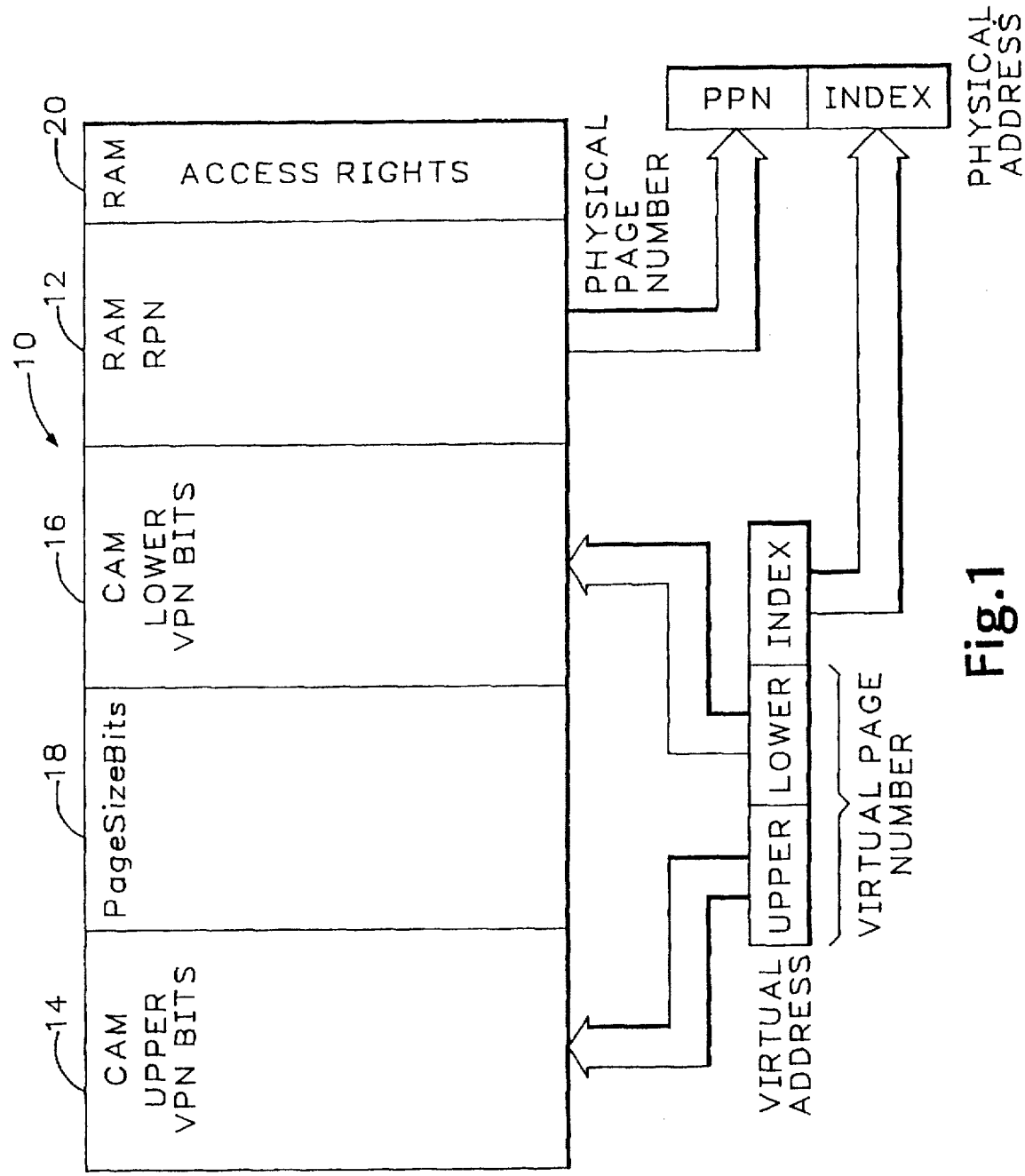
FIG. 1 is a floor plan of a translation look-aside buffer (TLB) according to the invention.

Referring to FIG. 1, a floor plan of a translation look-aside buffer (TLB) according to the invention is shown. The TLB 10 includes a page number memory 12 including a plurality of physical page number entries. Each physical page number entry is a virtual to physical address translation for a given virtual page number. The page number memory 12 is a conventional static random access memory (RAM), as is known in the art.

The TLB 10 also includes a first content addressable memory (CAM) 14 including a plurality of upper virtual page entries and a comparator circuit for each upper virtual page entry for comparing an upper portion of the virtual page number to the upper virtual page entries and indicating a match if the upper portion is found therein. The first CAM 14 is, therefore, a fully associative memory. Each of the entries in the first CAM 14 is associated with a corresponding entry in the page number memory 12.

The TLB 10 further includes a second content addressable memory (CAM) 16 including a plurality of lower virtual page entries and a comparator circuit for each lower virtual page entry for selectively comparing a certain number of bits in a lower portion of the virtual page number to a corresponding number of certain bits in the lower virtual page entries and indicating a match if the certain number of bits of the lower portion are found therein. Each entry in the second CAM 16 is associated with a corresponding physical page number entry in the page number memory 12. The TLB 10 indicates a hit if a match is produced in both the first and second content addressable memories 14 and 16 for the same physical page number entry.

Not all of the bits in the lower portion of the virtual page number are compared by the CAM 16 to the lower virtual page entries stored therein. The CAM 16 selectively compares certain bits of the lower virtual page entries to a corresponding number of bits of the lower portion of the virtual page number. This selective comparison allows for a variable page size for each entry in the TLB 10.

The TLB 10 includes a page size memory 18 including a plurality of page size entries, each of which specify the number of bits involved in the comparison in the second CAM 16 for the corresponding physical page number. Each page size entry in the page size memory 18 includes a plurality of bits. Each bit of a page size entry is associated with a corresponding bit in an entry in the second CAM 16. The state of the bit in the page size entry determines whether a comparison is performed between the corresponding bit in the CAM 16 and the associated bit in the lower portion of the virtual page number. If the bit in the page size entry is set to an enable state a comparison is performed. If the bit is set to a disable state, no comparison is performed. This operation will become more understandable when the schematic of the CAM 16 is described below with reference to FIG. 2.

The TLB 10 further includes an access rights memory 20 including a plurality of access rights entries indicating the access rights for a corresponding physical page number entry in the page number memory 12. The access rights include, e.g., read, write, execute, priority level, etc. These access rights allow the operating system to control access to the physical pages according to the rights.

Based on the description above, the TLB 10 can be considered as having a plurality of TLB entries, wherein each entry includes: an upper virtual page entry, a page size entry, a lower virtual page entry, an access rights entry, and a corresponding physical page number entry. The TLB 10, in the preferred embodiment, is a fully associative cache. However, the invention is not limited to fully associative, but instead can be applied to direct-mapped caches as well as set-associative caches.

Figure 2:
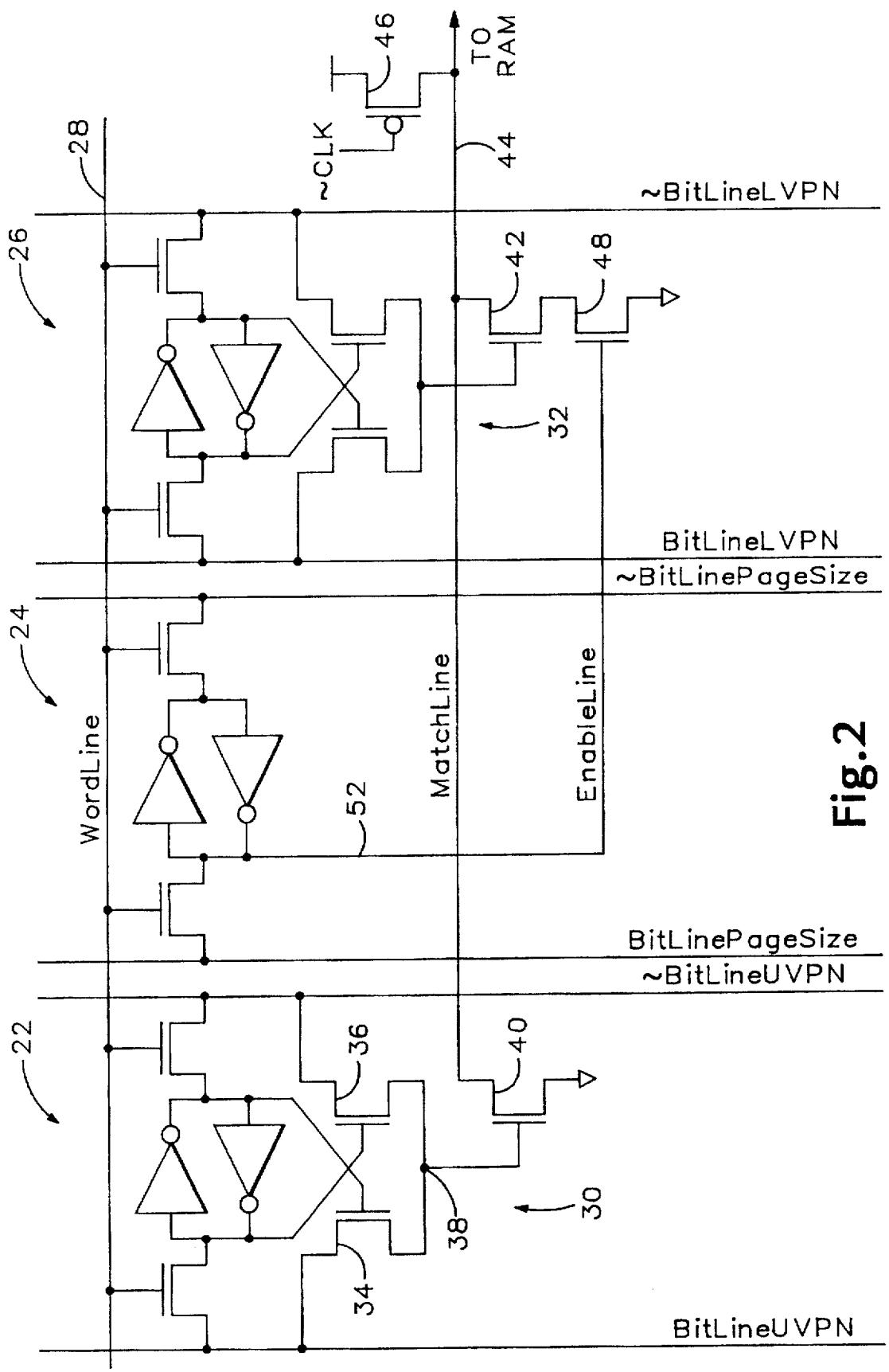
FIG. 2 is a schematic drawing of a portion of the TLB of FIG. 1.

Referring now to FIG. 2, a schematic of a portion of a TLB entry is shown. The shown portion includes a bit 22 of an upper virtual page entry, a bit 24 of a page size entry, and a bit 26 of a lower virtual page entry. Each of the bits 22, 24 and 26 are conventional six-transistor memory storage cells, as is known in the art. The bits 22, 24 and 26 are commonly driven by a word line 28, which is used to select the TLB entry. The word line 28 is connected to the gates of the two pass transistors associated with each bit, as is known in the art. Also associated with each bit are two complimentary bit lines, e.g., BitLineUVPN and ~BitLineUVPN, for reading and writing to the corresponding bits.

Associated with the bits 22 and 26 are respective single bit comparators 30 and 32. In the preferred embodiment, the single bit comparators 30 and 32 each include an exclusive OR gate (XOR) and a pulldown transistor, as is shown in FIG. 2. The XOR gates are comprised of two transistors each having an output terminal coupled together to form the output of the XOR gate. The XOR gates also include a first set of inputs coupled to the memory cell and a second set of inputs coupled to the bit lines, as is known in the art. For example, the XOR gate of comparator 30 includes field-effect transistors 34 and 36. The gates of the transistors 34 and 36 comprise the first set of inputs, which are coupled to the memory cell 22. The second set of inputs of the comparator 30 is comprised of the sources of transistors 34 and 36, which are coupled to the complementary bit lines. The sources of the transistors 34 and 36 are coupled together to form an output 38.

Pulldown transistors 40 and 42 are included in single bit comparators 30 and 32, respectively. The pulldown transistors each include a control input coupled to the output of the associated XOR gate. For example, the output 38 of comparator 30 is coupled to the control input, or gate for a field effect transistor, of pulldown transistor 40. The pulldown transistor 42 is similarly connected to the XOR gate of single bit comparator 32. The pulldown transistors are coupled to a match line 44 for pulling the match line low when the XOR gate does not produce a match in the comparison between the contents of the memory cell and the signals on the complementary bit lines. The match line is precharged high by a precharge transistor 46 coupled between a positive supply voltage and the match line 44. In the preferred embodiment, this precharge transistor 46 is a P-channel transistor having a control input driven by a complimentary clock signal ~CLK. Each bit of the upper and lower virtual page entries includes a similar pulldown transistor which is also coupled to the match line. As should be apparent from FIG. 2, if any one of the XOR gates does not produce a match, the associated pulldown transistor will pull the match line low indicating a miss in the corresponding TLB entry. For a fully associative TLB, as in the preferred embodiment, the virtual page number will be compared to all the entries in the TLB, while for a direct mapped TLB the virtual page number would be compared to only a single entry in the TLB.

Included in each bit of the lower virtual page entries is an enable transistor such as transistor 48 for selectively enabling the comparison of the associated single bit comparator. The enable gate includes a control input coupled to a corresponding bit in the corresponding page size entry. As shown in FIG. 2, the page size bit 24 is coupled to a control input 50 of enable transistor 48 via enable line 52. When the page size bit 24 is set to an enable state the enable transistor 48 is enabled and thereby allows the comparison by single bit comparator 32 to take place. If, on the other hand, the bit 24 is set to a disable state, the single bit comparator 32 is effectively disabled since the pulldown transistor 42 cannot pull the match line 44 low regardless of the output of the XOR gate. For the plurality of transistors shown in FIG. 2, the enable state is equal to a logic level 1 while the disable state is equal to a logic level 0. However, if alternative transistors are used, e.g., P-channel transistors, the logic levels of the enable and disable states would change accordingly.

Each bit in the lower virtual page entries has a corresponding bit in the associated page size entry. Thus, each bit in the lower virtual page entries can be selectively enabled or disabled based on the state of the corresponding bit in the associated page size entry. Each page size entry of the page size memory 18 can be set to a different binary value thereby allowing the operating system to vary the size of each page number individually. This provides the operating system with a tremendous amount of flexibility in assigning different page sizes to different tasks and/or processes.

Referring again to FIG. 1, the number of bits in the upper and lower portions of the virtual page number are determined by the size and number of the available page sizes. Although the lower portion of the virtual page number and the index of the virtual address are shown as fixed fields in FIG. 1, the size of these fields vary according to the size of the associated physical page number. The number of bits in the upper portion of the virtual page number is determined by the maximum allowable page size. For the maximum allowable page size, none of the bits in the lower portion of the virtual page number are compared by the second CAM 16, i.e., all of the comparators in the corresponding entry of the second CAM 16 are disabled. In this case of the maximum allowable page size, the index field actually includes all of the bits of the virtual address except the upper portion of the virtual page number. The number of bits in the corresponding physical page number would change accordingly. At the other extreme, for the minimum allowable page size, all of the bits in the lower portion of the virtual page number are compared by the second CAM 16. In this case, the index field does not include any of the bits of the lower portion of the virtual page number. Of course, there are many variations between these two extremes with the index field growing and the lower portion of the virtual page number retracting by a single bit for each enabled bit in the second CAM 16.

Figure 3:
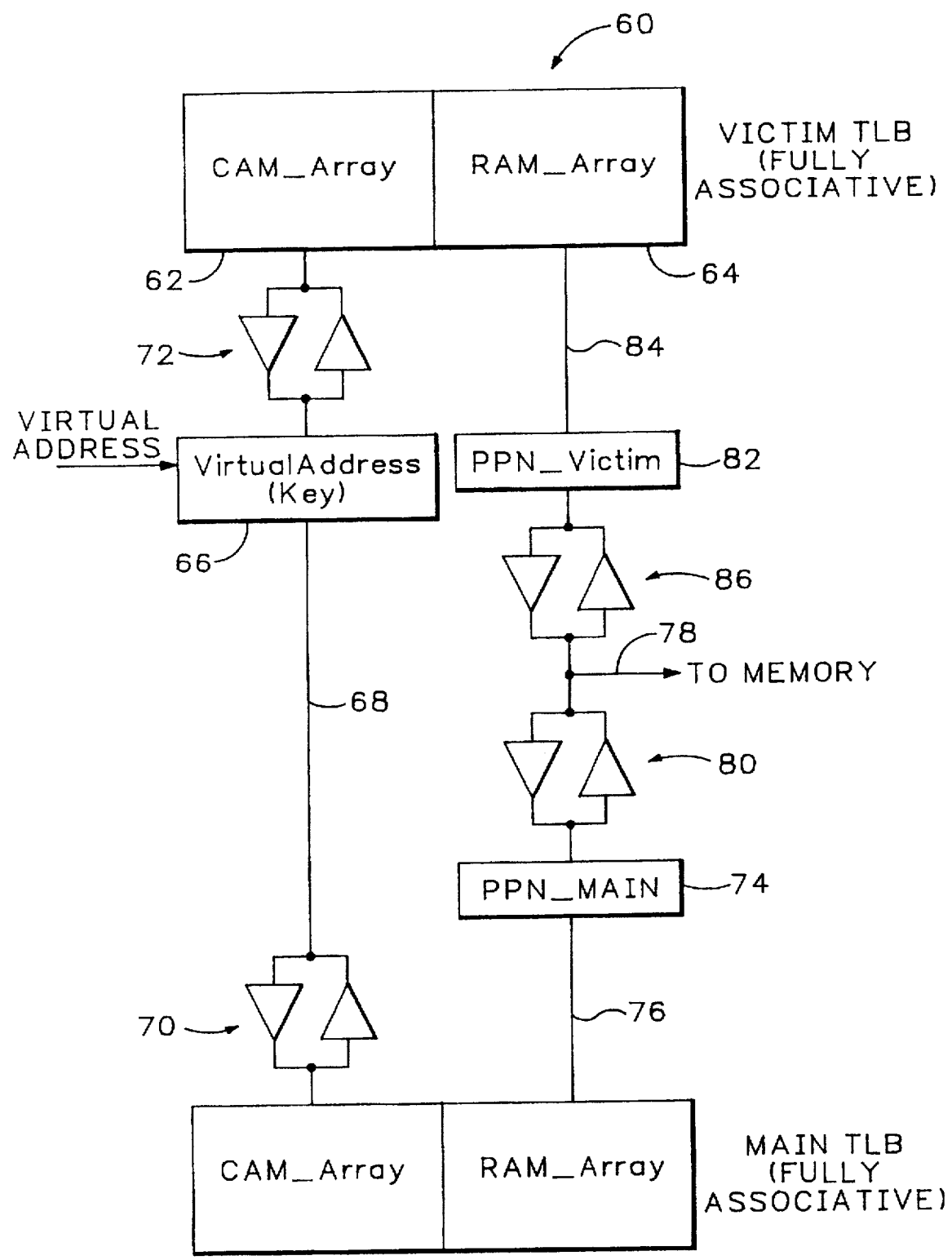
FIG. 3 is a block diagram of a second aspect of the invention including a victim TLB in addition to the TLB of FIG. 1.

In another aspect of the invention, as shown in FIG. 3, a fully associative victim TLB 60 is coupled to the TLB 10, known herein as the main TLB. The victim TLB is a fully associative cache including a content addressable memory array 62 for storing virtual page numbers and a RAM array 64 for storing corresponding physical page numbers. The victim TLB 60 is fully associative in that all of the entries in the victim TLB 60 are searched simultaneously to find a match when the TLB 60 is accessed. Similarly, in this embodiment of the invention, the main TLB 10 is fully associative. The size of the victim TLB can vary depending on the desired hit rate of the TLBs. The size of the entries in the victim TLB 60 matches that of the main TLB 10.

Victim caches have been used in the prior art, however, they have been used with direct mapped caches and not fully-associative caches. See Norman Jouppi, *Improving Direct-Mapped Cache Performance by the Addition of a Small Fully-Associative Cache and Prefetch Buffers*, Proceedings of the 17th Annual International Symposium on Computer Architecture, May 28-31, 1990, pp 364-373.

In operation, a virtual address register 66 receives the virtual address from a central processing unit (CPU) and latches the value therein. The contents of this register 66 are provided to the main TLB CAM over a bus 68 by bidirectional tristate drivers 70. The tristate drivers 70 are conventional bidirectional drivers having a direction input and an enable input. The associated logic for driving the tristate driver 70, along with all the other drivers hereinafter described is omitted in order to concentrate on the invention. It would be apparent to one skilled in the art how to design the logic necessary to drive these tristate drivers.

The contents of the register 66 are also provided to the CAM array 62 by a second set of bidirectional tristate drivers 72. The virtual address held in the register 66 is provided to the CAM array 62 at the same time. i.e., during the same clock cycle, as to the main TLB CAM. Therefore, both the main TLB and the victim TLB can be searched simultaneously.

The RAM array of the main TLB 10 is coupled to a register 74 over a bus 76. A physical page number of an entry in the TLB is stored in register 74, in the event there is a match in the main TLB. The contents of register 74, along with the physical page index (not shown) are provided to main memory over an address bus 78 by a third set of bidirectional tristate drivers 80. If there is a miss in the main TLB 10, as indicated on a HIT/MISS line (not shown), the data provided on bus 78 is simply ignored by the memory system.

In the event of a miss in the main TLB 10, the victim TLB is checked for a match. If there is a match in the CAM array 62 the associated physical page number stored in the RAM array 64 is provided to a register 82 over a bus 84 coupled between the array 64 and the register 82. The physical page number provided to the register 82 is then stored therein. The contents of the register 82 are then driven onto the address bus 78 by a fourth set of bidirectional tristate drivers 86. There is no contention for bus 78 because drivers 86 are enabled during a different time than the drivers 80, e.g., during a subsequent clock cycle, and only after a miss has been detected in the main TLB 10.

The TLB entries stored in the victim TLB 60 are those TLB entries of the main TLB that have been replaced according to the replacement algorithm of operating system in which the TLB operates. That is, when an entry is removed from the main TLB 10, that removed entry is stored in the victim TLB 60. This effectively lowers the miss rate of the overall combination of the main TLB and the victim TLB as compared to the main TLB alone. If there is a miss in the main TLB and a hit in the victim TLB, matching entry in the victim TLB can then be stored in the main TLB if so desired. Alternatively, the victim TLB entry can be kept only in the victim TLB 60. In the event that there is a miss in both the main TLB and the victim TLB and the physical page number from the page table needs to be fetched, the fetched physical page number can be stored in either the main or victim TLBs or both. The victim TLB 60, as described herein, can be used in combination with the variable page size TLB 10, as in the preferred embodiment, or with a fixed page size TLB organization.

Having described and illustrated the principles of the invention in a preferred embodiment thereof, it should be apparent that the invention can be modified in arrangement and detail without departing from such principles. We claim all modifications and variations coming within the spirit and scope of the following claims.

What is claimed is:

1. A translation lookaside buffer (TLB), comprising:
(A) a first fully associative cache having a first plurality of entries that are simultaneously accessible within a predetermined access time period;
(B) a second fully associative cache separate from the first fully associative cache and having a second plurality of entries that are also simultaneously accessible within the predetermined access time period;
(C) an interface circuit coupled to the first and second fully associative caches, wherein when the interface circuit receives an address, the interface circuit allows each of the first and second plurality of entries of the first and second fully associative caches to be searched by the address simultaneously;
(D) an address bus for outputting a physical page number corresponding to an entry in one of the first plurality of entries and the second plurality of entries;
(E) a first output register coupled to the first fully associative cache, the first output register being configured to receive and store the physical page number output from the first fully associative cache responsive to a match between the address and one of the first plurality of entries;
(F) a first transceiver coupled between the first output register and the address bus, the first transceiver being configured to enable the first output register onto the address bus responsive to a first cycle of a clock signal;
(G) a second output register coupled to the second fully associative cache, the second output register being configured to receive and store the physical page number output from the second fully associative cache responsive to a match between the address and one of the second plurality of entries; and (H) a second transceiver coupled between the second output register and the address bus, the second transceiver being configured to enable the second output register onto the address bus responsive to a second cycle of the clock signal;

such that both the first and second pluralities of entries are accessible within the predetermined access time period plus the second clock cycle.

2. The TLB of claim 1, wherein each of the first and second fully associative caches further comprises a content addressable memory (CAM) and a random access memory (RAM).

3. The TLB of claim 2, wherein the CAM for each bit of each of the first and second plurality of entries of the first and second fully associative caches comprises (i) a single bit comparator;

(ii) an enable transistor coupled to the single bit comparator for selectively enabling comparison of the single bit comparator.

4. The TLB of claim 1, wherein each of the first plurality of entries of the first fully associative cache represents a physical page of variable size, wherein each of the second plurality of entries of the second fully associative cache represents a physical page of variable size.

5. The TLB of claim 4, wherein each of the first and second fully associative caches further comprises (a) a RAM that stores a plurality of physical page number entries;

(b) a first CAM that stores a plurality of upper virtual page number entries and compares an upper portion of the address received from the interface circuit with each of the upper virtual page number entries simultaneously;

(c) a second CAM that stores a plurality of lower virtual page number entries and compares a lower portion of the address with each of the lower virtual page number entries simultaneously.

* * * * *